(12) United States Patent
Gross et al.

(10) Patent No.: US 11,167,451 B2
(45) Date of Patent: *Nov. 9, 2021

(54) LEWIS BASE-MEDIATED RECOVERY OF FIBERS FROM FIBER REINFORCED POLYMERS

(71) Applicant: The Boeing Company, Chicago, IL (US)

(72) Inventors: Adam F. Gross, Santa Monica, CA (US); Adam E. Sorensen, Malibu, CA (US); John J. Vajo, West Hills, CA (US); Hardik Dalal, Seattle, WA (US); Panagiotis Emanuel George, Lake Tapps, WA (US); Xin N. Guan, Monterey Park, CA (US)

(73) Assignee: The Boeing Company, Chicago, IL (US)

(*) Notice: Subject to any disclaimer, the term of this patent is extended or adjusted under 35 U.S.C. 154(b) by 437 days.

This patent is subject to a terminal disclaimer.

(21) Appl. No.: 16/054,544

(22) Filed: Aug. 3, 2018

(65) Prior Publication Data

US 2020/0039115 A1 Feb. 6, 2020

(51) Int. Cl.
*B29B 17/02* (2006.01)
*B01J 19/00* (2006.01)
*C08J 11/28* (2006.01)
*C08J 11/00* (2006.01)

(52) U.S. Cl.
CPC ....... *B29B 17/0206* (2013.01); *B01J 19/0013* (2013.01); *B01J 19/0053* (2013.01); *C08J 11/00* (2013.01); *C08J 11/28* (2013.01); *B01J 2219/00029* (2013.01); *B01J 2219/00051* (2013.01); *B29B 2017/0289* (2013.01); *B29B 2017/0293* (2013.01); *Y02W 30/62* (2015.05)

(58) Field of Classification Search
CPC ................ B01J 19/0013; B01J 19/0053; B01J 2219/00029; B01J 2219/00051; B29B 17/0206; B29B 2017/0289; B29B 2017/0293; C08J 11/00; C08J 11/26; C08J 11/28; C08J 2363/00; Y02W 30/62
See application file for complete search history.

(56) References Cited

U.S. PATENT DOCUMENTS

| | | |
|---|---|---|
| 2011/0065817 A1 | 3/2011 | Van Weynbergh et al. |
| 2014/0023581 A1 | 1/2014 | Adam |
| 2018/0086639 A1 | 3/2018 | Gross et al. |

FOREIGN PATENT DOCUMENTS

| | | | |
|---|---|---|---|
| CN | 102391543 | * | 5/2013 |
| FR | 3 037 067 | | 12/2016 |
| WO | WO2016/198781 | * | 12/2016 |

OTHER PUBLICATIONS

Machine translation of WO 2016/198781, Moisan, Dec. 15, 2016.*
Machine translation of CN 102391543, Xu et al, May 2013.*
Extended European Search Report prepared by the European Patent Office in application No. EP 19 18 9916.0 dated Jan. 3, 2020.

* cited by examiner

*Primary Examiner* — Frances Tischler
(74) *Attorney, Agent, or Firm* — McDonnell Boehnen Hulbert & Berghoff LLP

(57) ABSTRACT

Disclosed are methods and apparatus for recovering fibers from fiber reinforced polymers wherein the fiber reinforced polymer is contacted with a Lewis base for a time sufficient to allow at least partial depolymerization of the polymer.

19 Claims, 9 Drawing Sheets
(4 of 9 Drawing Sheet(s) Filed in Color)

LEWIS BASE-MEDIATED RECOVERY OF FIBERS FROM FIBER REINFORCED POLYMERS

FIELD

This disclosure relates to methods for recovering fibers from fiber reinforced polymers using at least one Lewis base having a melting point of at least about 35° C.

BACKGROUND

Fiber reinforced polymers (FRPs) are widely used to create structural elements and parts used in aerospace, automotive, watercraft, sporting goods, and civil/structural engineering applications among others. FRPs are strong, light-weight materials with high strength-to-weight ratios. FRPs typically are formed by combining fibers and an uncured binding polymer and then curing the binding polymer. Some non-limiting examples of FRPs include carbon fiber reinforced polymers and glass fiber reinforced polymers.

The wide use of FRPs has led to waste disposal issues and a demand for FRP recycling. Three general recycling methods that disrupt the polymer matrix have been used: mechanical, thermal, and chemical recycling. Mechanical FRP recycling uses mechanical methods such as grinding to convert large FRP pieces into small pieces and particles, ultimately resulting in resin-rich powders and very small fibers. A problem with mechanical recycling is that the polymer cannot be separated from the fibers and fiber length cannot be controlled. As a result, recovered fibers are of little value.

Thermal FRP recycling typically entails pyrolyzing FRPs in a controlled oxygen environment at very high temperatures to combust the polymer and leave recoverable fibers. Because pyrolysis requires very high temperatures, recovered fibers are often weakened and charred during the recycling process.

Chemical recycling converts the polymer portion of recycled FRPs into oligomers or monomers either through depolymerizing the polymer matrix via a process requiring supercritical or near-supercritical pressure, or through the use of ionic liquids at atmospheric pressure. At supercritical pressures, chemical recycling is expensive and dangerous. Additionally, ionic liquids that are capable of depolymerizing FRPs are expensive and susceptible to degradation through oxidation and ionization.

The volume of FRP's entering the waste stream from, for example, aircraft decommissioning and printed circuit board disposal is expected to grow. In addition, the value of the FRP fiber components such as carbon fibers can be quite high if they can be recovered in useful amounts and lengths.

A particular type of FRP is carbon fiber reinforced polymer (CFRP). CFRPs are increasingly common and have many different applications. Effective and efficient recycling methods are needed, especially to reclaim the carbon fibers-arguably the most expensive component of CFRPs. Ideally the carbon fibers are recovered intact and cleaned so they can be re-used in remanufacturing. Therefore, there is a need to develop improved methods of recycling carbon fibers.

Published U.S. Patent Application No. 2018/0086639A1 discloses the use of Lewis bases to depolymerize fiber reinforced polymers to allow for recovery of the fibers. That disclosure demonstrated the use of Lewis bases for depolymerizing fiber reinforced polymers on a relatively small scale, i.e., batches that employed 5 g of the Lewis base. That disclosure contains examples of depolymerization's using triphenylphosphine (TPP), triphenylphosphine oxide (TPPO), and triphenylphosphine sulfide (TPPS).

SUMMARY

This disclosure provides several improvements on the methods disclosed in Published U.S. Patent Application No. 2018/0086639A1. These improvements permit recovery of fibers from fiber reinforced polymers using Lewis bases on a scale larger than demonstrated in Published U.S. Patent Application No. 2018/0086639A1, i.e., a commercial or manufacturing scale. The methods and improvements disclosed herein for recovering fibers from fiber reinforces polymers (FRPs) can be used alone or in combination.

In one aspect, this disclosure provides methods of recovering free fibers from a fiber reinforced polymer, the methods comprising:
   contacting a fiber reinforced polymer with a molten Lewis base in a reaction vessel, wherein
      the Lewis base has a melting point of at least about 35° C.; and
      the fiber reinforced polymer is contained in a container, wherein the container is suspended in the vessel and comprises a plurality of perforations, and is configured for rotation within the vessel; and
   rotating the container while in contact with the molten Lewis base for a period of time sufficient to at least partially depolymerize a portion of the fiber reinforced polymer to yield free fiber.

In a related aspect, the disclosure provides apparatus for carrying out the depolymerization of fiber reinforced polymer. The apparatus comprises a reaction vessel comprising:
   a fiber container, i.e., a container suitable for holding fiber or FRP, adjacent the vessel,
      wherein the container comprises a plurality of perforations and is configured to be suspended within the vessel, and rotate within and move vertically in relation to the vessel.

In another aspect, this disclosure provides methods of recovering free fibers from a fiber reinforced polymer which comprise:
   contacting fiber reinforced polymer with a bath of molten Lewis base in a reaction vessel for a period of time sufficient to at least partially depolymerize a portion of the fiber reinforced polymer to yield a mass containing free fiber, depolymerized polymer resin, and Lewis base, wherein the Lewis base has a melting point of at least about 35° C.;
   optionally removing the mass from the bath; and
   cleaning the free fiber, wherein the cleaning is performed at a temperature greater than the melting point of the Lewis base.

In another aspect, this disclosure provides methods of recovering free fibers from a fiber reinforced polymer, the methods comprising:
   contacting fiber reinforced polymer with a bath of molten Lewis base in a reaction vessel for a period of time sufficient to at least partially depolymerize a portion of the fiber reinforced polymer to yield free fiber, wherein the Lewis base has a melting point of at least about 35° C.; and
      the reaction vessel is equipped with a condenser maintained at a temperature sufficient to condense and return liquid Lewis base to the reaction vessel;
   optionally removing the free fiber from the reaction vessel.

In another aspect, the disclosure provides apparatus for carrying out the depolymerization of fiber reinforced polymer in a reaction vessel equipped with a condenser.

In yet another aspect, this disclosure provides methods of recovering free fibers from a fiber reinforced polymer, the methods comprising:

contacting fiber reinforced polymer with a bath of molten Lewis base in a reaction vessel for a period of time sufficient to at least partially depolymerize a portion of the fiber reinforced polymer to yield free fiber, wherein the Lewis base has a melting point of at least about 35° C.; and the reaction vessel is equipped with a temperature monitoring system and temperature control system;

optionally removing the free fiber from the bath.

In another aspect, this disclosure provides methods of recovering free fibers from a fiber reinforced polymer, the methods comprising:

contacting fiber reinforced polymer with a bath of molten Lewis base for a period of time sufficient to at least partially depolymerize a portion of the fiber reinforced polymer to yield free fiber, wherein the Lewis base has a melting point of at least about 35° C.;

optionally removing the free fiber from the bath; and cleaning the free fiber, wherein the cleaning is performed by washing the free fiber with a solvent for the depolymerized polymer resin.

In still another aspect, this disclosure provides methods of recovering free fibers from a fiber reinforced polymer, the methods comprising:

contacting fiber reinforced polymer with a bath of molten Lewis base in a reaction vessel for a period of time sufficient to at least partially depolymerize a portion of the fiber reinforced polymer to yield free fiber, wherein the Lewis base has a melting point of at least about 35° C.; and the reaction vessel is equipped with a source of inert gas, and the source of inert gas is configured to produce a positive pressure of the inert gas in the reaction vessel without sweeping vapor of the Lewis base from the reaction vessel; and optionally removing the free fiber from the bath.

In another aspect, this disclosure provides methods for separating a Lewis base having a melting point above about 150° C. from a mixture of the Lewis base and depolymerized fiber reinforced polymer binder, the methods comprising:

dissolving the mixture of Lewis base and depolymerized binder in a first solvent to form a Lewis base/depolymerized binder solution;

adding to the solution a second solvent in which the Lewis base and depolymerized binder have different solubilities and allowing the depolymerized binder to precipitate from solution;

separating the Lewis base from the precipitated resin.

Thus, this disclosure provides improved methods and apparatus for the following aspects of processes for recovering fibers from fiber reinforced polymer materials using a Lewis base or combination thereof to at least depolymerize a portion of the polymer and release the fibers:

sample handling;
controlling the Lewis bath vapor,
avoiding oxidative or flammable conditions;
agitation during processing;
process monitoring;
reducing the amount of bath retained in the freed carbon fibers;
washing the freed carbon fibers; and
separating decomposed plastic resin from the used Lewis base to recover the decomposed resin and rejuvenate a used bath.

BRIEF DESCRIPTION OF THE FIGURES

The patent or application file contains at least one drawing executed in color. Copies of this patent or patent application publication with color drawings will be provided by the Office upon request and payment of the necessary fee.

DETAILED DESCRIPTION

Figure 1:
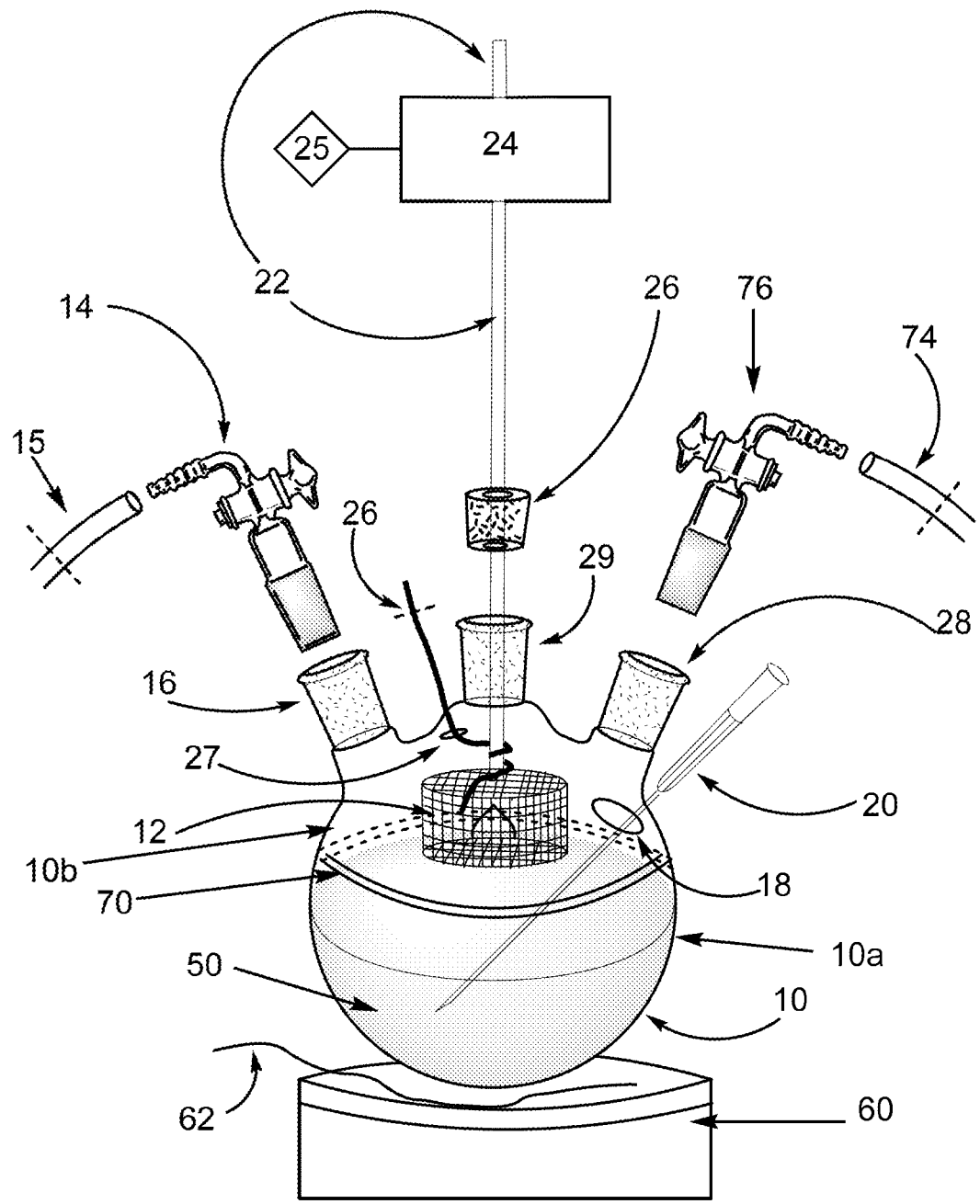
FIG. 1 is a semi-exploded view of an apparatus of this disclosure in which a fiber container is provided within the reaction vessel.

As noted above, this disclosure provides methods of recovering free fibers from a fiber reinforced polymer, the methods comprising:

contacting a fiber reinforced polymer with a molten Lewis base in a reaction vessel, wherein
the Lewis base has a melting point of at least about 35° C.; and
the fiber reinforced polymer is contained in a container, wherein the container is suspended in the vessel and comprises a plurality of perforations, and is configured to rotate within the vessel; and rotating the container while in contact with the molten Lewis base for a period of time sufficient to at least partially depolymerize a portion of the fiber reinforced polymer to yield free fiber.

In some embodiments, the polymer is depolymerized to a degree sufficient to produce fibers that are substantially free of polymer. In certain embodiments, the polymer is depolymerized to a degree sufficient to produce fibers that are, after cleaning, substantially free of polymer. In certain embodiments, the polymer is depolymerized to a degree sufficient to produce a fiber product that contains less than about 5%, or less than about 4%, or less than about 3% or less than about 2%, or less than about 1%, or less than about 0.1% or less than about 0.01%, or less than about 0.001% by weight polymer.

In some embodiments, the fibers released by the depolymerization described herein are cleaned to a degree sufficient to produce fibers that are substantially free of polymer resin, i.e., the product(s) of polymer depolymerization. In certain embodiments, the polymer is depolymerized to a degree sufficient to produce fibers that are, after cleaning, substantially free of polymer resin. In certain embodiments, the polymer is cleaned to a degree sufficient to produce a fiber product that contains less than about 5%, or less than about 4%, or less than about 3% or less than about 2%, or less than about 1%, or less than about 0.1% or less than about 0.01%, or less than about 0.001% by weight polymer resin.

In certain embodiments, the disclosure provides an apparatus for carrying out the depolymerization of fiber reinforced polymer. The apparatus comprises a reaction vessel comprising a container suitable for holding fiber or FRP, adjacent the vessel. The container comprises a plurality of perforations and is configured to be suspended within the vessel, and rotate within and move vertically in relation to the vessel.

In certain embodiments, the container is positioned within the reaction vessel, configured to rotate within the vessel, and connected to a motor capable of rotating the container. In certain embodiments, the connection to the motor and the motor are configured to permit the container to be lowered as necessary to immerse the container into molten Lewis base and raised at an appropriate time after completion of depolymerization to remove the container and its contents from the molten Lewis base.

In certain embodiments, the motor is configured to move the container in alternating upward and downward directions within the molten Lewis base. Such upward and downward movement can be used to impart additional mixing to the materials within the perforated container beyond that produced by rotating the container.

In certain embodiments, the vessel is equipped with a condenser. The condenser is preferably equipped with a system to heat the condenser to an appropriate temperature above ambient temperature. During use, the condenser is heated to a temperature above the melting point of the Lewis base sufficient to condense vapor of the Lewis base to liquid form.

An apparatus suitable for carrying out the methods of recovering free fibers from a fiber reinforced polymer is depicted in FIG. 1. FIG. 1 is an exploded view of a reaction vessel equipped with various parts and devices useful for recovering fibers from fiber reinforced polymers.

Referring to FIG. 1, reaction vessel 10 comprises a lower section 10a and a cover 10b. Although a glass round-bottomed flask is shown in FIG. 1 as reaction vessel 10 other configurations and materials are envisaged by this disclosure. Thus, reaction vessel 10 may be of any size and shape suitable for carrying out the depolymerization and may be made of glass or other suitable material, e.g., stainless steel.

Cover 10b is provided with ports 16, 18, 27, 28, and 29 for connecting other apparatus to the vessel or inserting devices into the vessel. Cover 10b is removably attached to lower section 10a at joint 70. When attached to lower section 10a, cover 10b provides air-tight seal to the vessel.

Prior to operation, reaction vessel 10 is filled with an appropriate amount of Lewis base and cover 10b affixed to lower section 10a to seal lower section 10a to cover 10b.

Port 29 is typically central to cover 10b and configured to receive bushing 26 through which a shaft 22 passes. Bushing 26, shaft 22, and port 29 form a seal during operation of the reactor.

Figure 3:
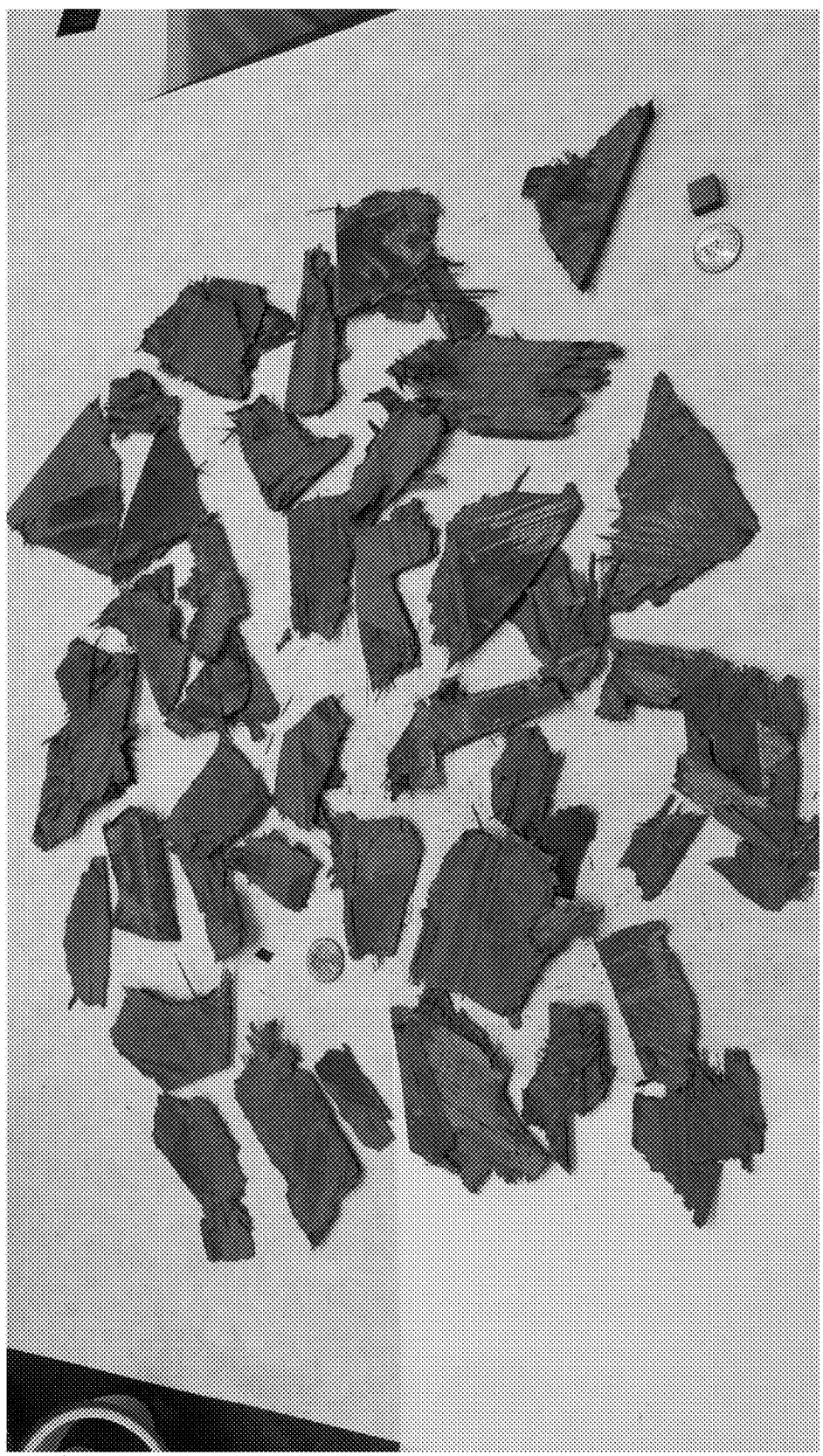
FIG. 3 is a photograph of pieces of carbon fiber reinforced polymer shredded and suitable for use in the disclosed recovery process.

Prior to operation, container 12 is filled with pieces of FRP. The pieces of FRP may be obtained by shredding larger parts of FRP or any other method for producing pieces of FRP. Preferred FRPs are carbon fiber reinforced polymer. Other preferred FRPs are epoxy-based FRPs such as carbon fiber reinforced epoxy polymers and fiberglass materials. In certain embodiments, the epoxy-based polymer is an amine-based epoxy. FIG. 3 shows pieces of shredded CFRP alongside a penny to indicate size of the pieces.

The amount of FRP to be depolymerized depends on the desired reaction time, the reaction temperature, and the size of the FRP container that will fit within the reaction vessel. For depolymerization reactions using, for example, 6 kg of Lewis base and a FRP loading of about 1400 grams (which requires a fiber/FRP container 12 sized appropriately for use within vessel 10), a suitable reaction vessel 10 is a 12 L round-bottomed reactor. When the reactor is a round-bottomed flask, this size provides sufficient head room (i.e., the space above the Lewis base in the reactor) for container 12 to be suspended after sealing the reactor and while the Lewis base is heated and melted.

Shaft 22 is attached at a first end to container 12 and to motor 24. Container 12 is also referred to herein as a fiber container or FRP container. As used herein, the terms "fiber container" and "FRP container" are synonymous and refer to a container suitable for holding FRP or fibers released from a FRP. Container 12 comprises a plurality of perforations to permit liquid to enter and drain from the container. In certain aspects, container 12 is perforated uniformly throughout its surface. In certain embodiments, container 12 is a cage.

Motor 24 is operatively connected to controller 25 and constructed to rotate shaft 22 and to allow shaft 22 to be lowered and raised vertically. In one embodiment, motor 24 is a motor capable of rotating shaft 22, and therefore container 12, in one direction or the other, i.e., clockwise or counterclockwise. In other embodiments, motor 24 is a reversing motor capable of rotating shaft 22, and therefore container 12, in alternating directions. In certain embodiments of the methods herein, shaft 22 and container 12 are rotated in alternating first and second directions every 0.1-10 seconds. In certain embodiments of the methods herein, shaft 22 and cage 12 are rotated about one-quarter, one-half, or three quarters, of a turn in each direction. In another embodiment, shaft 22 and cage 12 are rotated one, one and one-half, or more turns in each direction. In a particular embodiment, shaft 22 and cage 12 are rotated about three-fourths of a turn in each direction every two (2) seconds.

An example of a suitable reversing motor 24 is Caframo Model BDC2010.

Figure 1A:
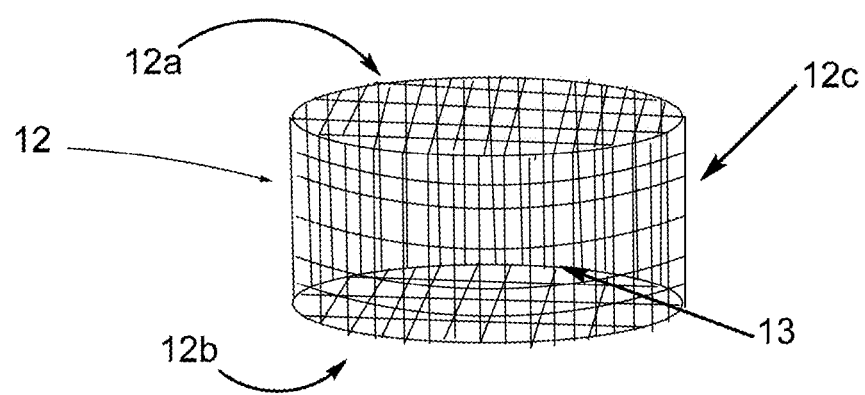
FIG. 1A is a perspective view of a container suitable for holding fiber and/or FRP.

FIG. 1A shows an example suitable container for use herein as container 12. As shown in FIG. 1A, container 12 can have a top 12a, a bottom 12b and side wall 12c. Container 12 also has perforations 13. Container 12 can have the same height, length, and width dimensions or different dimensions. Container 12 therefore can be a cylinder, cube, a sphere, or any other shape. In a particular embodiment, container 12 is cylindrical.

The perforations in container 12 can be any shape suitable for permitting liquid to flow into the container and to hold FRP or fibers. Thus, the perforations can be circular, rectangular, or irregularly shaped, or can be slits.

In certain embodiments, container 12 is a cage. As used herein, a cage is an enclosure having a frame and wire mesh or screen outer walls. In some embodiments, container 12 is a cage wherein some walls or sides of the cage are solid and others are perforated. In some embodiments, container 12 is equipped with a gate or door that permits FRP to be filled into the container and removal of fibers released as a result of FRP depolymerization. In certain embodiments, container 12 is a basket with a fully removable cover, or with a gate in the cover, side, or bottom.

Container 12 can be made of any material capable of withstanding the temperature and reaction conditions existing during the depolymerization reaction. Examples of suitable materials include stainless steel and copper. A suitable container is constructed to contain not only pieces of FRP, but also the fibers resulting from depolymerization of binder during the reaction to produce free fibers, which vary in size but can be in the range of about 1 mm to about 100 or more. Examples of fibers recovered using the apparatus and processes disclosed herein have lengths of from about 4 mm to about 6 mm. Thus, the size of the openings in the screen or mesh will be sufficient to retain the fibers after depolymerization. Suitable mesh opening sizes range from about 1 mm to about 15 mm.

Container 12 allows for supplying FRP to molten Lewis base, draining molten Lewis base after depolymerization, and for simple retrieval of the fibers released during depolymerization from the reaction vessel. As shown in FIG. 1, container 12 (here shown without FRP) can be held above the bath until the desired bath temperature has been reached. When the desired temperature is reached, container 12 can be lowered (dunked) into the bath to begin the depolymerization reaction. After the reaction, container 12 can be raised to stop the reaction by draining the bath from the freed carbon fibers. This enables a controllable reaction time.

As noted, bushing 26 permits both rotational and vertical movement of shaft 22. Thus, in addition to rotating the container in two dimensions, shaft 22 can relatively rapidly raised and lowered to add additional mixing to the system.

Reaction vessel 10 is supplied with a heat source. This is depicted in FIG. 1 as heating mantle 60 provided below vessel 10. In certain embodiments, the vessel can be fitted with additional heating devices, e.g., heating pads or coils to facilitate heating of the vessel. In certain embodiments, thermocouple 62 is provided between heating mantle 60 and vessel 10 to provide temperature measurement and control over the system. Alternatively, when, for example, the reaction vessel is a stainless steel reactor, the heat source may be built into the vessel walls as a jacket. In such vessels, temperature control systems, such as those described below, may be provided as standard components of the vessel.

In some embodiments, vessel 10 can also be provided with an inert gas source at port 16. Port 16 is optionally connected to a valve 14 which is connected to a source 15 of suitable inert gas, e.g., nitrogen, argon, or helium. The inert gas is used to purge the system of undesired gases and generate a blanket of the inert gas over the resulting reaction mixture. Purging of the system shown in FIG. 1 is realized by providing inert gas through port 16 and allowing it to exit via port 28 and vent tube 74. In certain embodiments, venting may be controlled by valve 76. Vent tube 74 may be vented to the atmosphere or to a suitable waste trap or collection system.

Reaction vessel 10 can be equipped with a device, preferably a thermocouple, to measure and control the temperature of the molten Lewis base, i.e., the bath. Thus, in certain embodiments, reaction vessel 10 is equipped with thermocouple 20, which can be inserted into the bath, for example, through port 18.

Temperature monitoring and control can also be accomplished via temperature measurements taken of the mixture within container 12. One example of a suitable setup is depicted in FIG. 1 which shows thermocouple 26 is inserted through port 27 into container 12. As shown, thermocouple 26 inserted into container 12 so that it will be between the pieces of FRP in container 12. In one embodiment, thermocouple 26 is insulated with a soft fiberglass braid (as opposed to a metal sheath), which enables it to be wound around shaft 22 when shaft 22 and container 12 are rotated. This winding permits container 12 to be rotated back and forth without the thermocouple wire becoming tangled.

Prior to reaction, pieces of FRP are placed into container 12 through the removable cover or the gate. At an appropriate point, container 12 is connected to shaft 22 and motor 24. Lewis base is added as a solid to reaction vessel lower section 10a and cover 10b positioned over and locked to lower section 10a. Thermocouples are inserted if desired. Inert gas flow is initiated through port 16, and heat is applied to the vessel. Once the desired reaction temperature is reached to produce a bath of molten Lewis base, container 12 is lowered into the bath. In FIG. 1, reaction vessel 10 contains molten Lewis base 50.

Ratios of FRP to Lewis base suitable for the depolymerization reaction will vary depending on various requirements and conditions. In certain situations, depolymerization reaction times of from about 5-60 minutes, more preferably about 15-45 minutes, and more preferably about 20-25 minutes are desirable. Using TPPO as the Lewis base at a temperature of about 350° C. at a weight FRP:TPPO ratio of about 0.05 to 0.1, preferably about 0.07, allows for an acceptable reaction time of about 15-30, preferably 20, minutes.

The depolymerization is permitted to proceed until all polymer binder in the FRP is depolymerized. This can be determined in several ways, for example, by trial and error. Once a reaction time and other conditions for a particular size batch have been determined, future reactions can be carried out simply and without the use of temperature monitoring and control.

When the reaction is complete, heating may be discontinued and container 12 removed from the bath by raising shaft 12.

At this point, container 12 contains a mass or cake of molten Lewis base, depolymerized polymer binder, and fibers. Molten Lewis base is permitted to drain from container 12 and fibers. Cleaning of the fibers follows.

Figure 2:
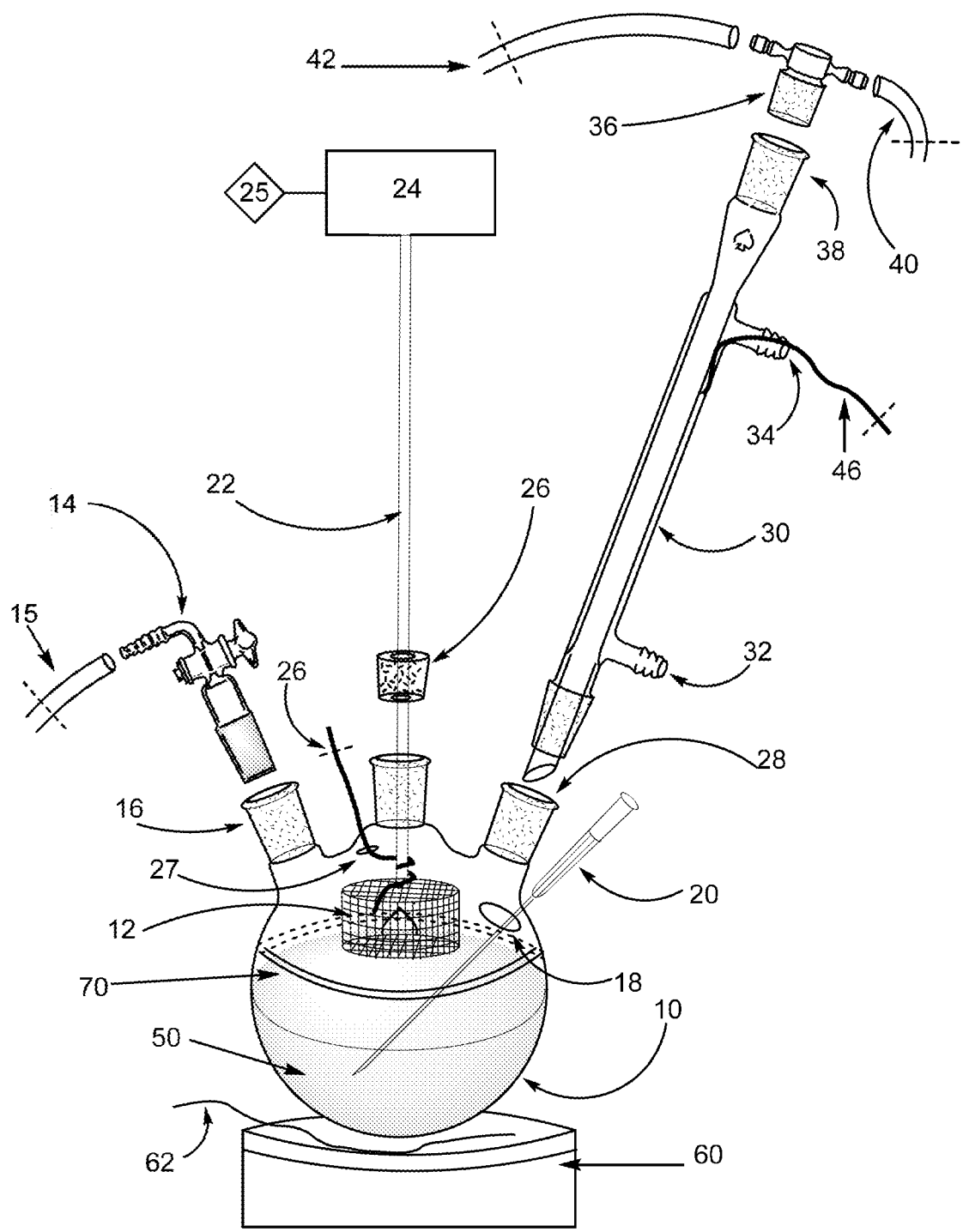
FIG. 2 is a semi-exploded view of an apparatus of this disclosure in which the reaction vessel is equipped with a condenser.

FIG. 2 shows an alternative configuration for the reaction apparatus. In FIG. 2, reaction vessel 10 is equipped with condenser 30 in place of vent tube 74.

Condenser 30 condenses heated Lewis base and prevents escape of the bath material from the reaction system. Condenser 30 is operated at a temperature sufficient to condense Lewis base to a liquid and to maintain the Lewis base in liquid form so that it does not solidify in the condenser but instead returns to lower section 10a of reaction vessel 10. Thus, condenser 30 is maintained at a temperature sufficient to condense and return liquid Lewis base to the reaction vessel. Condenser 30 is heated to a temperature above the melting point of the Lewis base and below its boiling point. Heating of condenser 30 can be accomplished in several ways. For example, a heated liquid, e.g., dimethylformamide (boiling point: 153° C.), 1-nonanol (boiling point: 214° C., melting point: −6° C.), or 1-decanol (boiling point: 230° C., melting point: 6° C.) can be supplied to condenser 30 via inlet 32 and outlet 34. The liquid will preferably be a liquid at ambient temperature and a liquid at the temperature at which the condenser is to be operated.

Alternatively, condenser 30 may be heated using a heating pad or heating tape (not shown).

As shown in FIG. 2, outlet port 34 is also fitted with a thermocouple 46 to monitor and control the temperature of the condenser. This thermocouple may be placed within inlet 32 or under a heating tape wrapped around the condenser (not shown).

In certain embodiments, condenser 30 is fitted at its distal end with a t-shaped gas joint 36 connected to inert gas source via supply line 40 and to a vent line 42. In certain embodiments, vent line 42 is connected to a pressure relief valve or bubbler, e.g., a water bubbler. Gas emissions from the system can be collected using a suitable waste trap or waste collection system.

In other embodiments, condenser 30 is simply fitted with a vent line (optionally through a valve) connected directly to a suitable waste trap or waste collection system to capture toxic materials produced by the reaction.

Prior to heating, reactor vessel 10 is purged through inlet 16 on cover 10b. At this point, supply line 40 is off; no gas is supplied via line 40. As a result, gas flows through the reactor and up and out of the reflux condenser, via vent line 42. During heating and reaction, inert gas flow is switched from the purge to a "blow-by" that flows over the outlet (top) of condenser 30 and out vent 42. The flow is controlled to produce a slight positive pressure inside reaction system without creating gas flow that would sweep out vapors of the Lewis base or the reaction product depolymerization products.

In certain embodiments, the source of the inert gas is to produce a pressure of about 5 Torr (0.1 psi) to about 1000 Torr (20 psi) in the reaction vessel. In certain embodiments, e.g., when reaction vessel is a 12 L round-bottomed flask charged with 6 kg of Lewis base, a flow rate for the inner gas of about 250 ml to about 5 l/minute, or about 1 to about 3 L/minute, or about 1.5 to 2 L/minute it is sufficient to produce a desirable pressure.

Without being bound by a particular theory, it is believed that higher temperatures cause the depolymerization reaction to proceed at a faster rate. Thus, when the Lewis base is TPPO which has a boiling point of about 360° C., temperature at or slightly below 360° C. is believed to be desirable.

In certain embodiments, reaction vessel 10 is a pressure vessel capable of containing the depolymerization reaction at elevated pressures of up to about 50 psi. It is believed that carrying out the reaction at both elevated temperature and pressure would cause the depolymerization to proceed at an even faster rate.

In certain embodiments, the Lewis base is heated to a temperature between about 150° C. and 360° C. and maintained at that temperature during the depolymerization reaction.

Subsequent to depolymerization and removal from the Lewis base bath, the fibers are cleaned. Cleaning may be carried out on the mass before or after cooling. Cleaning herein means that the free fibers are separated from the Lewis base and any products of polymer depolymerization (polymer resin).

In certain embodiments, the cleaning is carried out at a temperature greater than the melting point of the Lewis base.

In one embodiment, cleaning comprises washing the mass to yield free fiber, wherein the washing comprises washing the mass with a gas or washing the mass with a solvent in which each of the Lewis base and the depolymerized polymer resin are soluble. Examples of suitable solvents for washing the mass to eliminate Lewis base and depolymerized polymer resin from the free fibers are acetone, 2-butanone, tetrahydrofuran, ethyl acetate, dichloromethane, dioxane, methyl-t-butyl ether, diisopropylether, toluene, methanol, ethanol, propanol, isopropyl alcohol, n-butanol, t-butanol, DMF, 1-nonanol, 1-decanol, and mixtures thereof. Examples of suitable solvent systems for washing the mass to recover clean fibers are ethyl acetate/acetone, acetone/methanol, acetone/ethanol, acetone/propanol, 2-butanone/methanol, 2-butanone/ethanol, and acetone/isopropanol mixtures. Other examples of suitable solvent systems for washing the mass to recover clean fibers include of 1:1 v/v acetone/methanol, 2:1 v/v acetone/methanol, 31 v/v acetone/methanol, 4:1 v/v acetone/methanol, 5:1 v/v acetone/methanol, 6:1 v/v acetone/methanol, 7:1 v/v acetone/methanol, and 8:1 v/v acetone/methanol, 9:1 v/v acetone/methanol, and 10:1 v/v acetone/methanol. Still other examples of suitable solvent systems for washing the mass to recover clean fibers include of 1:1 v/v 2-butanone/methanol, 2:1 v/v 2-butanone/methanol, 31 v/v 2-butanone/methanol, 4:1 v/v 2-butanone/methanol, 5:1 v/v 2-butanone/methanol, 6:1 v/v 2-butanone/methanol, 7:1 v/v 2-butanone/methanol, and 8:1 v/v 2-butanone/methanol, 9:1 v/v 2-butanone/methanol, and 10:1 v/v 2-butanone/methanol. Still other examples of suitable solvent systems for washing the mass to recover clean fibers include of 1:1 v/v 2-butanone/ethanol, 2:1 v/v 2-butanone/ethanol, 31 v/v 2-butanone/ethanol, 4:1 v/v 2-butanone/ethanol, 5:1 v/v 2-butanone/ethanol, 6:1 v/v 2-butanone/ethanol, 7:1 v/v 2-butanone/ethanol, and 8:1 v/v 2-butanone/ethanol, 9:1 v/v 2-butanone/ethanol, and 10:1 v/v 2-butanone/ethanol. Other examples of suitable solvent systems for washing the mass to recover clean fibers include of 1:1 v/v acetone/ethanol, 2:1 v/v acetone/ethanol, 31 v/v acetone/ethanol, 4:1 v/v acetone/ethanol, 5:1 v/v acetone/ethanol, 6:1 v/v acetone/ethanol, 7:1 v/v acetone/ethanol, and 8:1 v/v acetone/ethanol, 9:1 v/v acetone/ethanol, and 10:1 v/v acetone/ethanol. And other examples of suitable solvent systems for washing the mass to recover dean fibers include of 1:1 v/v acetone/ethyl acetate, 2:1 v/v acetone/ethyl acetate, 31 v/v acetone/ethyl acetate, 4:1 v/v acetone/ethyl acetate, 5:1 v/v acetone/ethyl acetate, 6:1 v/v acetone/ethyl acetate, 7:1 v/v acetone/ethyl acetate, and 8:1 v/v acetone/ethyl acetate, 9:1 v/v acetone/ethyl acetate, and 10:1 v/v acetone/ethyl acetate. Yet other examples of suitable solvent systems for washing the mass to recover dean fibers include of 1:1 v/v ethyl acetate/methanol, 2:1 v/v ethyl acetate/methanol, 31 v/v ethyl acetate/methanol, 4:1 v/v ethyl acetate/methanol, 5:1 v/v ethyl acetate/methanol, 6:1 v/v ethyl acetate/methanol, 7:1 v/v ethyl acetate/methanol, and 8:1 v/v ethyl acetate/methanol, 9:1 v/v ethyl acetate/methanol, and 10:1 v/v ethyl acetate/methanol.

Washing can be done by simply pouring solvent over the mass while supported on, for example, a screen or filter. Washing can also be done by spraying the mass, optionally under pressure (pressure washing) to remove the Lewis base and the depolymerized polymer resin from the fibers. Washing can be accomplished with hot solvent, e.g., at a temperature above the melting point of the Lewis base (if done at ambient pressure, the solvent must also be liquid at that temperature). Examples of solvents useful for hot washing of the mass include dimethylformamide (boiling point: 153° C.), 1-nonanol (boiling point: 214° C., melting point: −6° C.), 1-decanol (boiling point: 230° C., melting point: 6° C.), and hexamethylphosphoramide (boiling point: 233° C.).

In another embodiment, washing of the fiber mass can be carried out by blowing a gas, preferably a pressurized gas, at and over the fiber cake to remove Lewis base retained in the cake. In certain embodiments, the gas is an inert gas such as nitrogen, argon, or helium. In other embodiments, the gas is heated. The heated gas may be nitrogen, argon, or helium.

Optionally, either simultaneous with or subsequent to, the inert gas cleaning, pressurized water or steam can be used to further clean the fibers.

Alternatively cleaning comprises removing free fiber from the mass by spinning the mass, by pressing the mass, or a combination thereof. Spinning can be carried out using a heated spin dryer at an operating temperature that at least softens the Lewis base to that at least a portion of it may be removed by centrifugal force from the fiber mass or cake. Preferably, the spinning will be carried out at a temperature at which the Lewis base is a liquid, e.g., for TPPO about 150-155° C. Spinning should be carried out at a spin rate sufficient to remove the liquid material but low enough to avoid damaging the loose fibers. Spin dryers are commercially available from various sources including Gala Industries, Inc., Eagle Rock, Va.

Removal of Lewis base and other depolymerization products from the mass can also be accomplished by pressing the cake. Thus, hot mass containing TPPO, depolymerized polymer, and carbon fibers can be pressed between a pair of heated plates, e.g., aluminum plates, at a pressure sufficient to squeeze liquid from the fibers. Preferably, the pressing process is carried out at elevated temperature, typically a temperature at which the Lewis base and other non-fiber products are at least soft, and preferably at a temperature at which those products are liquid. In the case of TPPO, a suitable temperature is about above about 125° C., or above about 150° C. In certain embodiments, one of the plates can have openings through which the liquid products are forced to yield fibers with little or no residual TPPO and depolymerized polymer.

In certain embodiments, cleaning of the free fibers will include a combination of washing, spin drying, and pressing. These cleaning processes may be carried out on a hot mass or after it is cooled. Cleaning may also be carried out while heating any solvents and apparatus used to clean the fibers. Alternatively, cleaning may be carried out at ambient temperature.

In certain embodiments herein, the fiber reinforced polymer comprises carbon fibers. In other embodiments, the fiber reinforced polymer is a carbon fiber reinforced polymer.

In certain embodiments, the fiber reinforced polymer comprises an epoxy binder. In other embodiments, the epoxy binder is an amine-based epoxy binder.

Lewis bases suitable for use in the methods of this disclosure have a melting point above about 35° C. In certain embodiments, the Lewis base has a melting point above about 85° C.; in other embodiments, the Lewis base has a melting point above about 125° C.; in still other embodiments, the Lewis base has a melting point above about 150° C. Examples of suitable Lewis bases useful in all methods disclosed herein are described in Published U.S. Patent Application No. 2018/0086639A1. In certain embodiments, the Lewis base is Triphenylphosphine, Triphenylphosphine oxide, Triphenylphosphine sulfide, Tributyl phosphine oxide, Tris(2-ethylhexyl)phosphine oxide, Phenylbis(2,4,6-trimethylbenzoyl)phosphine oxide. Trioctylphosphine oxide, Triethylphosphine oxide, Diphenylphosphine oxide, Methyldiphenylphosphine oxide, or a mixture thereof.

In certain embodiments, the Lewis base is Triphenylphosphine, Triphenylphosphine oxide, Triphenylphosphine sulfide, Tributyl phosphine oxide, Tris(2-ethylhexyl)phosphine oxide, Phenylbis(2,4,6-trimethylbenzoyl)phosphine oxide, Trioctylphosphine oxide, Triethylphosphine oxide, Diphenylphosphine oxide, Methyldiphenylphosphine oxide, or a mixture thereof.

In other embodiments, the Lewis base is Triphenylphosphine. Triphenylphosphine oxide, or Triphenylphosphine sulfide. In still other embodiments, the Lewis base is Triphenylphosphine oxide.

A triphenylphosphine oxide bath may be used several times; in certain embodiments, at least up to 0.3 grams of CFRP per gram of TPPO, or at least up to 0.5 grams of CFRP per gram of TPPO, or up to 1 gram of CFRP per gram of TPPO, can be depolymerized before a bath will become unusable. At some point, however, a used TPPO bath will need to be replaced or rejuvenated. A used bath may be rejuvenated by removing the depolymerized/decomposed polymer material; TPPO is not chemically degraded during the depolymerization.

This disclosure provides a process to perform this separation; the process involves 1) dissolving the mixture to be separated in a suitable solvent and then 2) adding a second solvent which is completely miscible with the first solvent but in which the materials to be purified are insoluble, i.e., an antisolvent. The process for rejuvenating a used TPPO bath containing decomposed CFRP resin employs a first solvent in which both the TPPO and decomposed resin dissolve. The second or antisolvent is chosen such that addition of the antisolvent causes both the TPPO and the decomposed resin to precipitate, but at different rates or times during the addition of the antisolvent. Accordingly, these solvents are selected so that, during these precipitations, the TPPO and decomposed resin phases physically separate; typically the decomposed resin precipitates first during the addition of the antisolvent. The decomposed resin forms a layer at the bottom of the reaction vessel while the TPPO is suspended in the solvent mixture. The suspension of TPPO may be decanted from the container containing decomposed resin and subsequently isolated by filtering.

Thus, this disclosure also provides methods for separating a Lewis base having a melting point above about 150° C. from a mixture of the Lewis base and depolymerized fiber reinforced polymer binder, the method comprising:
  dissolving the mixture of Lewis base and depolymerized binder in a first solvent to form a Lewis base/depolymerized binder solution;
  adding to the solution a second solvent in which the Lewis base and depolymerized binder have different solubilities and allowing the depolymerized binder to precipitate from solution;
  separating the Lewis base from the precipitated resin.

Although these separation processes can be applied to any Lewis base, it is particularly useful for use wherein the Lewis base is triphenylphosphine, triphenylphosphine oxide, or Triphenylphosphine sulfide. In certain embodiments of these separation methods, the Lewis base is triphenylphosphine oxide (TPPO).

In certain embodiments of this separation process, the first solvent is acetone, ethanol, isopropyl alcohol, n-propanol, n-butanol, isobutanol, sec-butanol, or a mixture thereof.

In other embodiments of this separation process, the second solvent is water.

In certain embodiments, the separating is carried out between a temperature of about 20° C. and the boiling point of the first solvent.

In other embodiments, the depolymerized fiber reinforced polymer binder is a depolymerized epoxy binder. In still other embodiments, the depolymerized epoxy binder is an amine-based epoxy binder.

In a commercial or manufacturing environment, efficiency demands will require the processes disclosed herein to be carded out using minimal material and energy input and in the shortest time possible to meet cost targets. Thus, minimizing heat input and the use of materials such as the Lewis base and wash solvents is desirable. Balanced against the need to minimize the amounts of materials used is the need to produce free fibers from FRP as quickly as possible. The processes and apparatus disclosed herein can be conveniently and appropriately adjusted by, for example, changing the amount of Lewis base or cleaning solvent used, to achieve an acceptable overall process time to produce free fibers of a particular desired quality.

EXAMPLES

Example 1: Depolymerization

In this example, a 12 L round bottom flask is used as a reactor to accommodate 6 Kg of Lewis base, triphenylphosphine oxide. This flask is contained in a fitted heating mantle covering the lower half and a thermal jacket over the top half.

The fiber reinforced polymer used in this example is pieces of CFRP. These pieces are multi-ply (estimated to be 16-32 ply), irregularly shaped, and range from about 10 mm to about 100 mm in their longest dimension.

Figure 4:
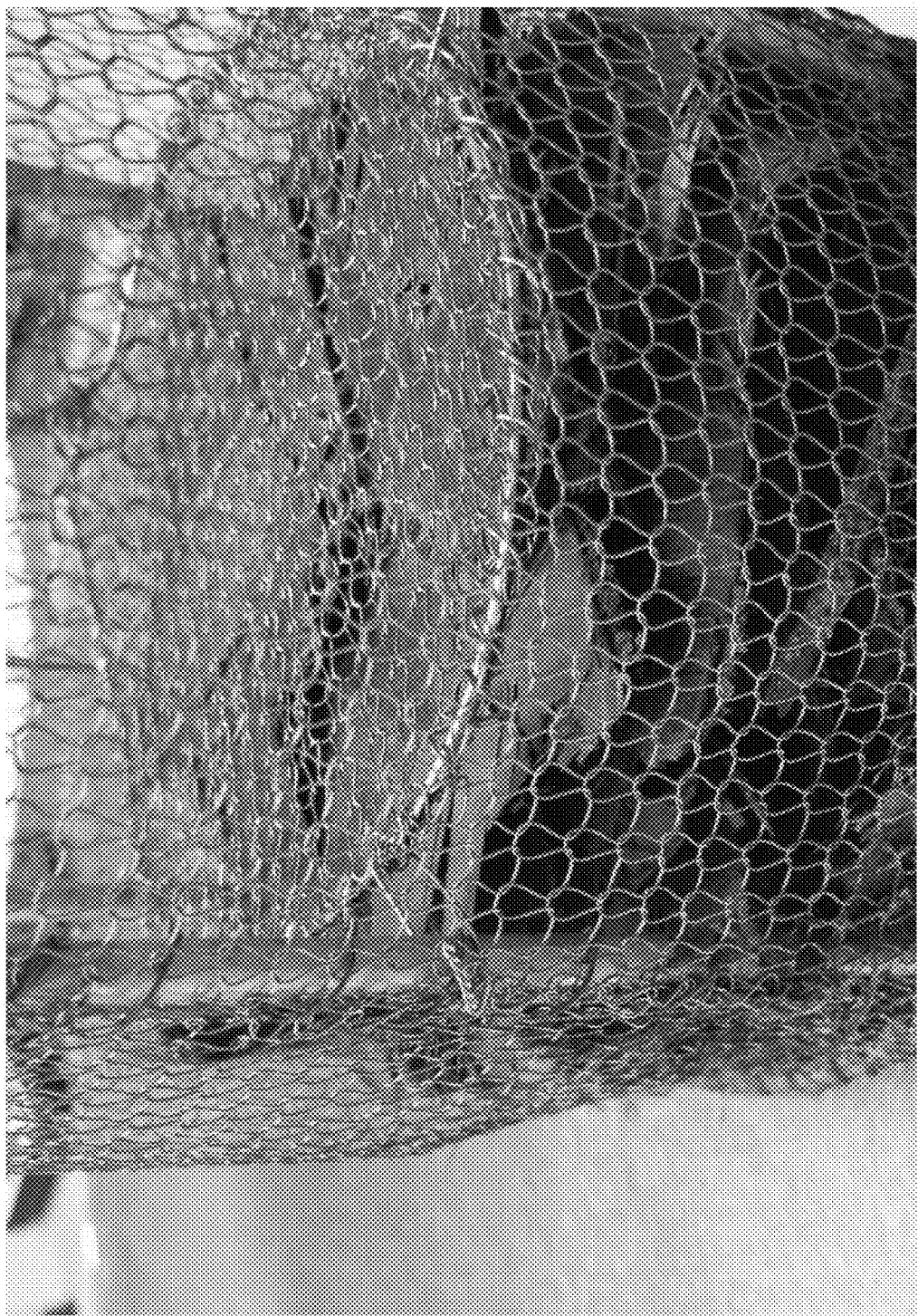
FIG. 4 is a photograph showing pieces of carbon fiber reinforced polymer within a container of the disclosure.
Figure 5:
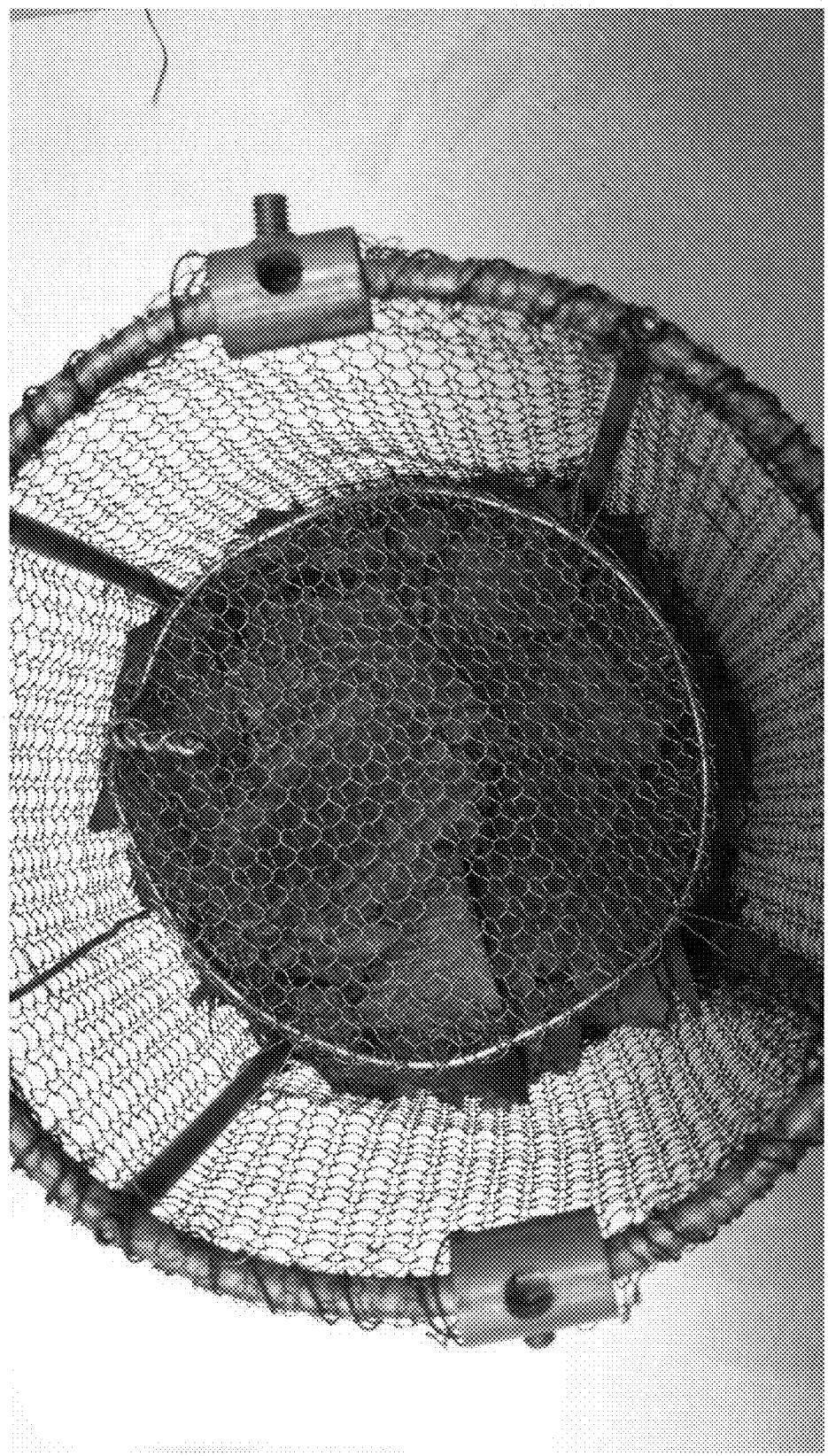
FIG. 5 is a top view of a cage containing pieces of carbon fiber reinforced polymer.
Figure 6:
FIG. 6 is a photograph of a piece of 1 cm×1 cm×32-ply CFRP (left) and carbon fibers (right) recovered according to the process disclosed herein.

The pieces of CFRP are placed into in a FRP container, here a cylindrical wire mesh basket (see FIGS. 4 and 5), which is later inserted into the reactor. The basket walls are formed of wire mesh in which the openings (perforations) are of a size appropriate to retain the fibers during and after depolymerization. The basket is provided with a wire mesh screen cover, in this example wired to the basket just above the level of the CFRP pieces that have been placed into the basket; this prevents any of the CFRP pieces or carbon fibers from floating out of the basket when it is immersed in the bath or during depolymerization. The perforated container, i.e., the covered basket, is a cage that contains the CFRP pieces and retains the fibers released during depolymerization.

The FRP container is connected to a shaft passing through a bushing at the top of the reactor. The shaft cooperates with the bushing to allow translational and rotational motion of the FRP container while still maintaining a seal on the reactor.

Depolymerizations using triphenylphosphine oxide (TPPO) as the Lewis base are carried out with molten TPPO maintained at a temperature of about 350° C., i.e., about 10° C. below the boiling point of TPPO (about –360° C.). The reactor is sealed except for a reflux condenser to avoid loss of TPPO during the process. This condenser is wrapped with heating tape connected to a variable transformer and heated to about 200° C. during the reaction causing any evaporated TPPO to condense back to a liquid and drain back into the reactor.

The depolymerization reaction is conducted under an inert atmosphere, in this example a blanket of nitrogen gas. Prior to heating, the reactor is purged through an inlet on the lid. In this example, the reflux condenser is equipped at its top with a t-shaped outlet connected via one arm to the inert atmosphere source and via the other arm to a water bubbler. During heating and reaction, the nitrogen flow is switched from the purge to a "blow-by" that flows through the t-shaped outlet attached to the condenser and to the bubbler.

The FRP container is connected to a Model BDC2010 reversing mixer (Caframo) so that the cage may be rotated automatically. The motor can be used in reversing or normal mode. Normal mode permits mixing of the FRP with molten Lewis base. In addition to mixing FRP and molten Lewis base, the reversing mode permits a thermocouple to be inserted into the FRP container to monitor the temperature of the Lewis base within the container. The mixer is "bored-through", which permits the shaft and cage to be lowered and raised without repositioning the mixer. The reversing motor can also be a motor that rotates the shaft and simultaneously moves the shaft in an up and down motion relative to the flask.

Control and characterization of the depolymerization reaction is accomplished with a recording (data logging) thermocouple meter to monitor four thermocouples.

One thermocouple is located on the heating mantle, between the mantle and the flask. The thermocouple used in this example employs two controllers because the heating mantle has two separate heaters. A second thermocouple is inserted into the bath. A third thermocouple is inserted into the FRP container and between pieces of CFRP. This thermocouple is insulated with a soft glass wool braid (as opposed to a metal sheath), which enables the thermocouple to be wound around the shaft of the basket several times. This winding permits the basket to be rotated back and forth without tangling of the thermocouple. The fourth thermocouple is positioned to measure the condenser temperature; in this example it is inserted under the heating tape of the reflux condenser.

The FRP container is filled with pieces of CFRP (about 400 g) and moved into a reactor charged with about 6 kg of solid TPPO. The FRP container containing the CFRP pieces is held above the TPPO while the TPPO is heated to about 350° C. (a mantle temperature of 400° C. gives a bath temperature of about 350° C.) to form a bath of molten TPPO. The condenser is heated to about 200° C. The depolymerization reaction is initiated when the bath temperature remains steady at about 350° C. at which time the basket is lowered (dunked) into the bath of molten TPPO. Prior to immersion into the molten TPPO, the inside the FRP container is about 270° C. Upon immersion into the molten TPPO bath, the temperature inside the FRP container rises quickly from about 270° C. to about 350° C. At this point, the reversing mixing is started and the FRP container is rotated back and forth for about 20 min. The mixer is set to reverse direction every 2 seconds at a speed which permits about a turn of the shaft/cage. Mixing is stopped after about 20 minutes and the FRP container is raised from the bath. The TPPO is allowed to drain from the loose carbon fibers into the bath. The fibers form a dense mass or cake at the bottom of the FRP container. The entire system (the bath and mass contained in the FRP container) may be allowed to cool to room temperature or the FRP container and mass may be removed from the reactor while still hot for cleaning of the fibers. If the FRP container is left in the reactor until cool, it is removed from the reactor when convenient and the mass subsequently removed from the FRP container.

Draining of the TPPO after depolymerization as described in this example forms a mass with TPPO and fiber at a ratio of about 1.35 g TPPO per gram of fiber.

Example 2: Fiber Pressing

A hot mass containing TPPO, depolymerized polymer, and carbon fibers is pressed between a pair of heated plates, e.g., aluminum plates, at a pressure sufficient to squeeze liquid from the fibers. The amount of retained TPPO is reduced by about 20%; i.e., from 1.38 g TPPO/g fiber to 1.09 g TPPO/g fiber.

Example 3: Fiber Spinning

A hot mass containing TPPO, depolymerized polymer, and carbon fibers is dried using a centrifugal dryer with heating to remove TPPO and depolymerized polymer from the fibers. The mass is added hot to the dryer basket, the basket placed into the dryer, and the dryer activated to initiate heating and centrifugal (spin) drying. Drying is carried out until the amount of TPPO and depolymerized polymer reaches a desired level.

Example 3: Fiber Washing

After squeezing to reduce the TPPO content as described in Example 2, two portions (10.8 g and 131.5 g respectively) of a solidified fiber cake are separated from the cake. Washing is then carried out using a pressurized solvent wash by placing samples on a screen in a vessel capable of catching wash solvent, e.g., a bucket. The solvent is supplied from a commercial consumer hand-pumped pressure washer. A pressure of between about 1.75 bar (about 25 psi) and about 7 bar (about 100 psi) is used. An example of the washer is a 3.5 gallon, epoxy-coated, steel tank hand pump sprayer, commercially available from McMaster-Carr.

Figure 7A:
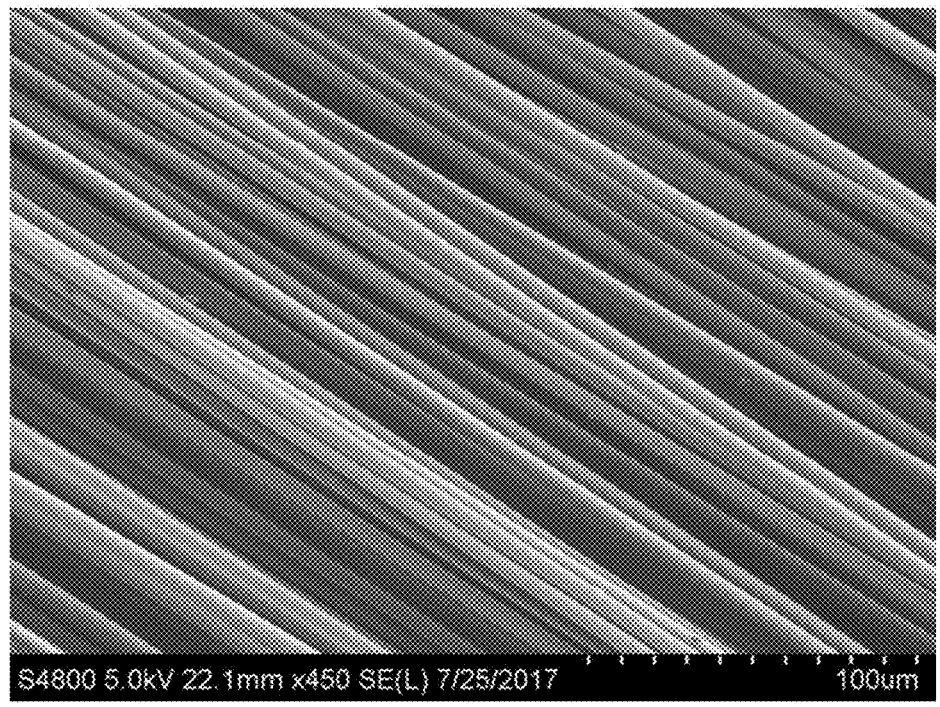
FIG. 7A is a low magnification scanning electron microscope image of carbon fibers washed as described in Example 3.
Figure 7B:
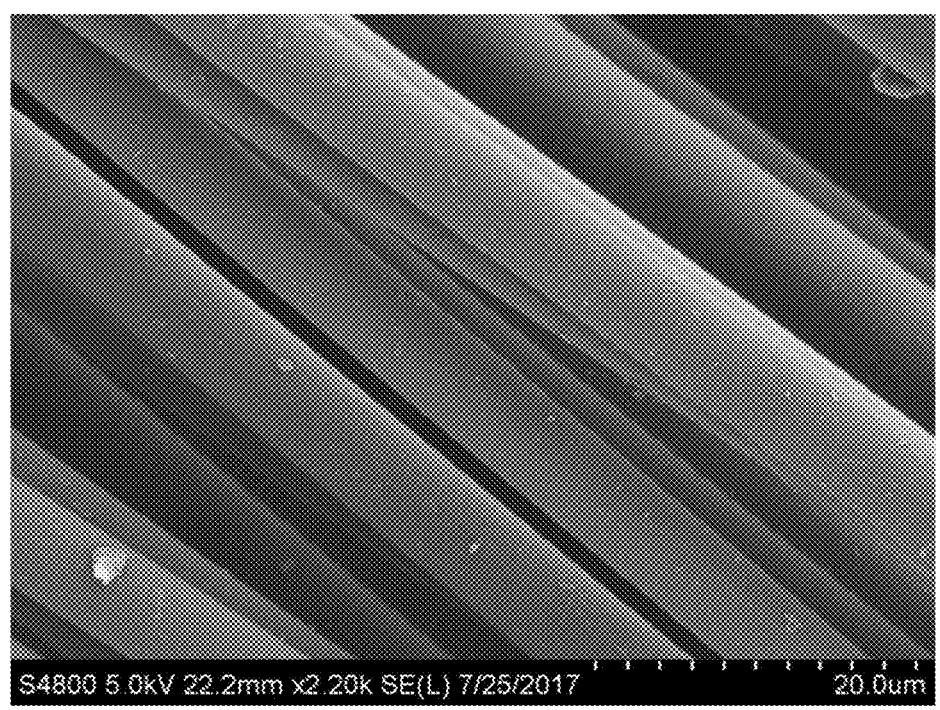
FIG. 7B is a high magnification scanning electron microscope image of carbon fibers washed as described in Example 3.

The 10.8 g portion is washed with 6 gallons of solvent (6:1 v/v acetone/methanol) in 3 mins (2 gal/min). The solidified cake quickly breaks down and spreads out over the screen in a thin layer within about 3 minutes. After drying, 6.8 g of carbon fibers is obtained. These fibers are very clean by feel and by SEM, as shown in FIGS. 7a and 7b.

The 131.5 g portion of the squeezed fiber cake from is washed using the pressure washer and same acetone/methanol solvent. This cake is manually turned and teased apart to expose solidified chunks of TPPO. After 8 min of washing using 16 gallons of solvent, 75 g of clean fibers (as shown by SEM analysis) are obtained.

Solvent is recycled to the extent possible in the 10.8 g sample and the 131.5 g sample resulting in use of a total of about 7 gallons of solvent.

Example 4: Soxhlet Extraction Fiber Cleaning

A Soxhlet extractor is used to wash 120 g of fiber cake and produce clean fibers. The solvent is 6:1 v/v acetone/methanol. About 2200 mL of solvent is added to a round bottom flask equipped with the extractor and heat source. Extraction is initiated and after several hours produces cleaned fibers.

Example 5: Solvent Free Fiber Cleaning

After removing the fiber cake from the TPPO bath hot (above the meting point of TPPO) pressurized inert gas, e.g., nitrogen, is blown at and over the fiber cake to remove TPPO retained in the cake.

Optionally, either simultaneous with or subsequent to, the inert gas cleaning, pressurized water or steam is used to further clean the fibers.

Example 6: Acetone/Water Separation of Decomposed Resin from Used TPPO Bath

Used TPPO (contains TPPO and depolymerized polymer resin) (0.51 g) was dissolved in 3.1 g of acetone. Water was added causing the TPPO and decomposed resin to separately precipitate. Addition of about 6 g of water results in coalescence of resin into a layer on the bottom of the vessel. The TPPO remains in the solution as a milky suspension. The suspension may be poured off and the TPPO recovered by filtering, centrifuging, or evaporation.

Used TPPO (10.4 g) obtained from a 6 kg depolymerization bath is used for this example. The bath was used to depolymerize several batches of CFRP (about 1920 g of CFRP); thus the bath was used to depolymerized about 0.32 g CFRP/g TPPO. The used TPPO is dissolved in 59.1 g of acetone and then 123.5 g of water is added to precipitate the TPPO and decomposed resin. The suspended TPPO is poured off and centrifuged to recover 6.2 g of TPPO. The supernatant from the centrifuging still contained suspended TPPO and another 1.8 g is recovered by evaporation. A total of 8 g TPPO is recovered. The amount of resin obtained is approximately 1 g.

Example 7: Analysis of Recovered TPP

Figure 8:
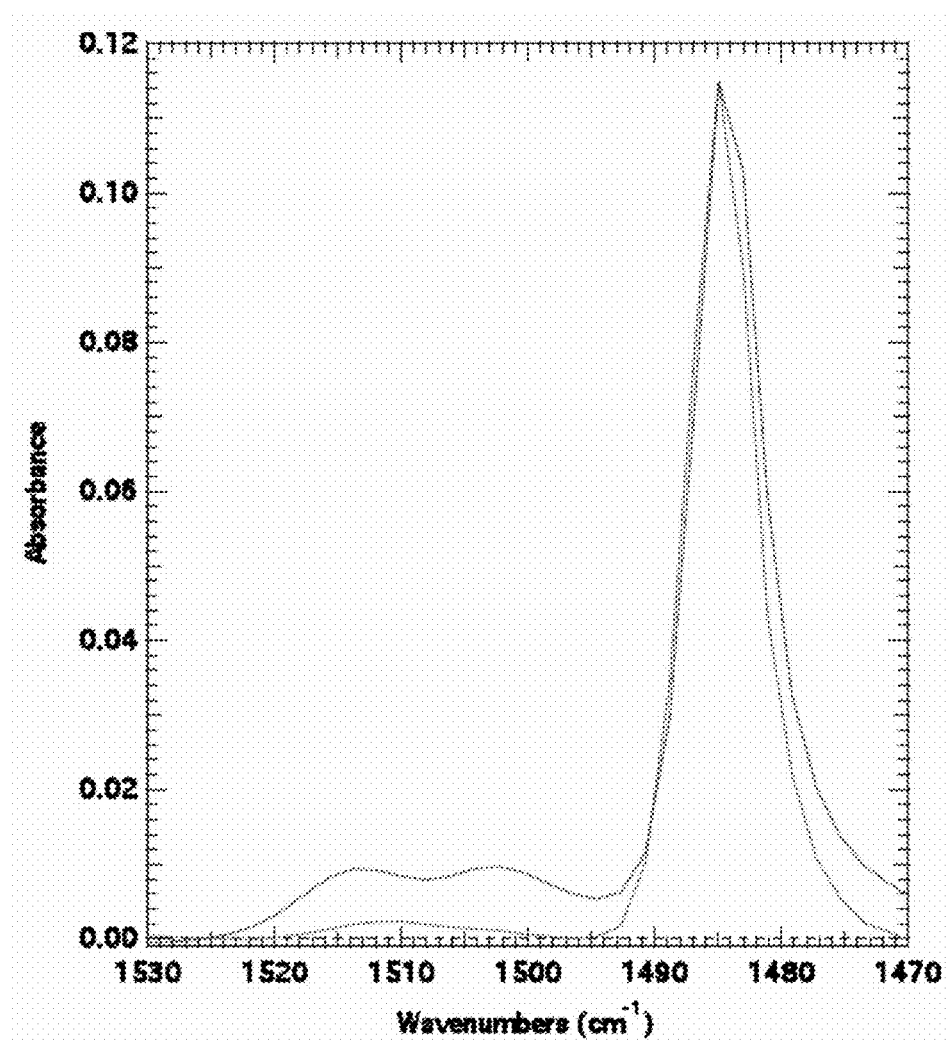
FIG. 8 is an infrared spectrum showing purification of the used TPPO.

The TPPO recovered in Example 6 (recovered TPPO) is analyzed using infrared (IR) spectroscopy and elemental analysis. IR spectra of used and recovered TPPO are shown in FIG. 8 with the blue trace representing used TPPO and the red trace representing recovered TPPO. Both spectra have had baselines subtracted and have been normalized to the peak at 1485 $cm^{-1}$, which is characteristic of TPPO. The peaks at 1502 cm and 1514 $cm^{-1}$ are characteristic of decomposed (depolymerized) resin. The ratio of the resin peaks for the recovered TPPO to used TPPO are 0.20 (for 1513.9 $cm^{-1}$) and 0.11 (for 1502.3 $cm^{-1}$). Thus, FIG. 8 shows that the acetone/water separation process results in a 5× to 10× reduction in decomposed resin content.

Example 8: Acetone/Water Separation of Decomposed Resin from Used TPPO Bath

Pure TPPO (1 g) was dissolved in about 2 g of acetone heated to about 60° C. Slow addition of water (11 g total) to the acetone/TPPO solution first causes the mixture to become cloudy, with additional water a liquid phase separated at the bottom of the vessel, and with still more water TPPO precipitates.

EMBODIMENTS

Embodiment 1

A method of recovering free fibers from a fiber reinforced polymer, the method comprising:
  contacting a fiber reinforced polymer with a molten Lewis base in a reaction vessel, wherein
    the Lewis base has a melting point of at least about 35° C.; and
    the fiber reinforced polymer is contained in a container, i.e., a container suitable for holding fiber or FRP, wherein the container is suspended in the vessel and comprises a plurality of perforations, and is configured for rotation within the vessel;
  rotating the container while in contact with the molten Lewis base for a period of time sufficient to at least partially depolymerize a portion of the fiber reinforced polymer to yield free fiber; and
  optionally removing the free fiber from the reaction vessel.

Embodiment 2

A method according to claim 1, wherein the container is rotated in alternating first and second directions every 0.1-10 seconds.

Embodiment 3

A method according to claim 1 or claim 2, further comprising cleaning the free fiber, wherein the cleaning is performed at a temperature greater than the melting point of the Lewis base.

Embodiment 4

A method according to any one of embodiments 1-3, wherein the cleaning comprises washing the mass to yield free fiber, wherein the washing comprises washing the mass with a gas or washing the mass with a solvent in which each of the Lewis base and the depolymerized polymer resin are soluble.

Embodiment 5

A method according to any one of embodiments 1-4, wherein the cleaning comprises removing free fiber from the mass by spin drying the mass, by pressing the mass, or a combination thereof.

Embodiment 6

A method according to any one of embodiments 1-5, wherein the temperature of the molten Lewis base is between about 150° C. and 360° C.

Embodiment 7

A method according to any one of embodiments 1-6, where the contacting is carried out under an inert atmosphere.

Embodiment 8

A method according to any one of embodiments 1-7, wherein the reaction vessel is equipped with a condenser maintained at a temperature sufficient to condense and return liquid Lewis base to the reaction vessel.

Embodiment 9

A method according to any one of embodiments 1-8, wherein the fiber reinforced polymer is contained in a container provided within the reaction vessel and configured to rotate within the reaction vessel and to move vertically within and in relation to the vessel.

Embodiment 10

A method according to any one of embodiments 1-9, further comprising rotating the container in alternating first and second directions.

Embodiment 11

A method according to any one of embodiments 1-10, wherein the reaction vessel is equipped with a temperature monitoring and control system.

Embodiment 12

A method according to any one embodiments 1-11, further comprising cleaning the free fiber by washing the free fiber at temperature above the melting point of the Lewis base with a solvent in which each of the Lewis base and the depolymerized polymer resin are soluble.

Embodiment 13

A method according to any one embodiments 1-12, wherein the reaction vessel is equipped with a source of inert gas, and the source of inert gas is adapted to produce a positive pressure of the inert gas in the reaction vessel without sweeping vapor of the Lewis base from the reaction vessel.

Embodiment 14

A method according to embodiment 8, wherein the reaction vessel is equipped with a condenser having a reaction vessel end and a distal end, wherein the distal end is fluidly coupled to a source of inert gas and the source of inert gas is adapted to produce a positive pressure of the inert gas in the reaction vessel without sweeping vapor of the Lewis base from the reaction vessel.

Embodiment 15

A method according to embodiment 14, further comprising adjusting the source of the inert gas to produce a pressure of about 5 Torr (0.1 psi) to about 1000 Torr (20 psi) in the reaction vessel.

Embodiment 16

A method according to any one of embodiments 1-15, wherein the fiber reinforced polymer comprises carbon fibers.

Embodiment 17

A method according to any one embodiments 1-16, wherein the fiber reinforced polymer comprises an epoxy binder.

Embodiment 18

A method according to any 1 of embodiments 1-17, wherein the epoxy binder is an amine-based epoxy binder.

Embodiment 19

A method of recovering free fibers from a fiber reinforced polymer, the method comprising:
  contacting fiber reinforced polymer with a bath of molten Lewis base in a reaction vessel for a period of time sufficient to at least partially depolymerize a portion of the fiber reinforced polymer to yield a mass containing free fiber, depolymerized polymer resin, and Lewis base, wherein the Lewis base has a melting point of at least about 35° C.;
  optionally removing the mass from the bath; and
  cleaning the free fiber, wherein the cleaning is performed at a temperature greater than the melting point of the Lewis base.

Embodiment 20

A method according to embodiment 19, wherein the cleaning comprises washing the mass to yield free fiber, wherein the washing comprises washing the mass with a gas or washing the mass with a solvent in which each of the Lewis base and the depolymerized polymer resin are soluble.

Embodiment 21

A method according to any one of embodiments 19-20, wherein the cleaning comprises removing free fiber from the mass by spin drying the mass, by pressing the mass, or a combination thereof.

Embodiment 22

A method of recovering free fibers from a fiber reinforced polymer, the method comprising:
contacting fiber reinforced polymer with a bath of molten Lewis base in a reaction vessel for a period of time sufficient to at least partially depolymerize a portion of the fiber reinforced polymer to yield free fiber, wherein the Lewis base has a melting point of at least about 35° C.; and
the reaction vessel is equipped with a condenser maintained at a temperature sufficient to condense and return liquid Lewis base to the reaction vessel;
optionally removing the free fiber from the reaction vessel.

Embodiment 23

A method of recovering free fibers from a fiber reinforced polymer, the method comprising:
contacting fiber reinforced polymer with a molten Lewis base in a reaction vessel, wherein
the Lewis base has a melting point of at least about 35° C.; and
the fiber reinforced polymer is contained in a container provided within the reaction vessel and configured to rotation within the vessel;
rotating the cage in alternating first and second directions for a period of time sufficient to at least partially depolymerize a portion of the fiber reinforced polymer to yield free fiber; and
optionally removing the free fiber from the reaction vessel.

Embodiment 24

A method of recovering free fibers from a fiber reinforced polymer, the method comprising:
contacting fiber reinforced polymer with a bath of molten Lewis base in a reaction vessel for a period of time sufficient to at least partially depolymerize a portion of the fiber reinforced polymer to yield free fiber, wherein the Lewis base has a melting point of at least about 35° C.; and
the reaction vessel is equipped with a temperature monitoring system and temperature control system;
optionally removing the free fiber from the bath.

Embodiment 25

A method according to embodiment 24, wherein the fiber reinforced polymer is contained in a cage provided within the reaction vessel and immersed in the bath, wherein the cage is adapted for rotation within the reaction vessel.

Embodiment 26

A method according to embodiment 25, wherein the temperature monitoring system comprises a thermocouple positioned external to the cage and within the bath of molten Lewis base.

Embodiment 27

A method according to embodiment 25, wherein the temperature monitoring system comprises a thermocouple positioned internal to the cage.

Embodiment 28

A method according to embodiment 25, wherein the reaction vessel is fitted with a heating device and a thermocouple positioned to monitor the temperature of the heating device.

Embodiment 29

A method of recovering free fibers from a fiber reinforced polymer, the method comprising:
contacting fiber reinforced polymer with a bath of molten Lewis base for a period of time sufficient to at least partially depolymerize a portion of the fiber reinforced polymer to yield free fiber, wherein the Lewis base has a melting point of at least about 35° C.;
optionally removing the free fiber from the bath; and
cleaning the free fiber, wherein the cleaning is performed by washing the free fiber with a solvent for the depolymerized polymer resin.

Embodiment 30

A method of recovering free fibers from a fiber reinforced polymer, the method comprising:
contacting fiber reinforced polymer with a bath of molten Lewis base in a reaction vessel for a period of time sufficient to at least partially depolymerize a portion of the fiber reinforced polymer to yield free fiber, wherein the Lewis base has a melting point of at least about 35° C.; and
the reaction vessel is equipped with a source of inert gas, and the source of inert gas is adapted to produce a positive pressure of the inert gas in the reaction vessel without sweeping vapor of the Lewis base from the reaction vessel; and
optionally removing the free fiber from the bath.

Embodiment 31

A method according to any one of embodiments 1-30, wherein the Lewis base is Triphenylphosphine, Triphenylphosphine oxide, Triphenylphosphine sulfide, Tributyl phosphine oxide, Tris(2-ethylhexyl)phosphine oxide, Phenylbis(2,4,6-trimethylbenzoyl)phosphine oxide, Trioctylphosphine oxide, Triethylphosphine oxide. Diphenylphosphine oxide, Methyldiphenylphosphine oxide, or a mixture thereof.

Embodiment 32

A method according to any one embodiments 1-30, wherein the Lewis base is Triphenylphosphine, Triphenylphosphine oxide, or Triphenylphosphine sulfide.

Embodiment 33

A method according to any one embodiments 1-30, wherein the Lewis base is Triphenylphosphine oxide.

Embodiment 34

A method for separating a Lewis base having a melting point above about 150° C. from a mixture of the Lewis base and depolymerized fiber reinforced polymer binder, the method comprising:
  dissolving the mixture of Lewis base and depolymerized binder in a first solvent to form a Lewis base/depolymerized binder solution;
  adding to the solution a second solvent in which the Lewis base and depolymerized binder have different solubilities and allowing the depolymerized binder to precipitate from solution;
  separating the Lewis base from the precipitated resin.

Embodiment 35

A method according to embodiment 34, wherein the Lewis base is Triphenylphosphine, Triphenylphosphine oxide, or Triphenylphosphine sulfide.

Embodiment 36

A method according to embodiment 34 or embodiment 35, wherein the first solvent is acetone, ethanol, isopropyl alcohol, n-propanol, n-butanol, isobutanol, sec-butanol, or a mixture thereof.

Embodiment 37

A method according to any one of embodiments 34-36, wherein the second solvent is water.

Embodiment 38

A method according to any one of embodiments 34-37, wherein the separating is carried out between a temperature of about 20° C. and the boiling point of the first solvent.

Embodiment 39

A method according to any one embodiments 34-38, wherein the depolymerized fiber reinforced polymer binder is a depolymerized epoxy binder.

Embodiment 40

A method according to any one of embodiments 34-39, wherein the depolymerized epoxy binder is an amine-based epoxy binder.

Embodiment 41

A reaction vessel comprising:
  a fiber container adjacent the vessel, wherein the container comprises a plurality of perforations and is configured to be suspended within the vessel and rotate within and move vertically in relation to the vessel.

Embodiment 41

An apparatus according to embodiment 41, wherein the reaction vessel further comprises a condenser equipped with a system for heating gas within the condenser.

Embodiment 41

An apparatus according to embodiment 41 or 42, wherein the reaction vessel is equipped with a condenser fluidly coupled to a source of inert gas and the source of inert gas is configured to produce a positive pressure of the inert gas in the reaction vessel.

Having described the invention in detail and by reference to specific examples thereof, it will be apparent that modifications and variations are possible without departing from the scope of the invention defined in the appended claims. More specifically, although some aspects of the present invention are identified herein as particularly advantageous, it is contemplated that the present invention is not necessarily limited to these particular aspects of the invention.

What is claimed is:

1. A method of recovering free fibers from a fiber reinforced polymer, the method comprising:
  contacting a fiber reinforced polymer with a molten Lewis base in a reaction vessel, wherein
    the molten Lewis base has a melting point of at least about 35° C.; and the fiber reinforced polymer is contained in a container, wherein the container is suspended in the reaction vessel and comprises a plurality of perforations, - and the container is configured to rotate within the vessel;
  rotating the container while in contact with the molten Lewis base for a period of time sufficient to at least partially depolymerize a portion of the fiber reinforced polymer to yield free fiber,
  wherein the Lewis base is Triphenylphosphine, Triphenylphosphine oxide, Triphenylphosphine sulfide, Tributyl phosphine oxide, Tris(2-ethylhexyl)phosphine oxide, Phenylbis(2,4,6-trimethylbenzoyl)phosphine oxide, Trioctylphosphine oxide, Triethylphosphine oxide, Diphenylphosphine oxide, Methyldiphenylphosphine oxide, or a mixture thereof.

2. The method according to claim 1, wherein the container is rotated in alternating first and second directions every 0.1-10 seconds.

3. The method according to claim 1, further comprising removing the free fiber from the reaction vessel.

4. The method according to claim 3, further comprising cleaning the free fiber, wherein the cleaning is performed at a temperature greater than the melting point of the Lewis base.

5. The method according to claim 4, wherein the contacting results in a mass comprising at least partially depolymerized fiber reinforced polymer, and the cleaning comprises washing the mass to yield free fiber, wherein the washing comprises washing the mass with a gas or washing the mass with a solvent in which each of the molten Lewis base and the depolymerized polymer resin are soluble.

6. The method according to claim 5, wherein the cleaning comprises removing free fiber from the mass by spinning the mass, by pressing the mass, or a combination thereof.

7. The method according to claim 1, wherein the temperature of the molten Lewis base is maintained at between about 150° C. and 360° C. in the reaction vessel for the period of time sufficient to at least partially depolymerize a portion of the fiber reinforced polymer to yield free fiber.

8. The method according to claim 1, where the contacting is carried out under an inert atmosphere.

9. The method according to claim 1, wherein the reaction vessel is equipped with a condenser maintained at a temperature sufficient to return the molten liquid Lewis base to the reaction vessel.

10. The method according to claim 1, wherein the reaction vessel is equipped with a temperature control system.

11. The method according to claim 3, further comprising cleaning the free fiber by washing the free fiber at temperature above the melting point of the Lewis base with a liquid in which each of the Lewis base and the depolymerized polymer resin are soluble.

12. The method according to claim 1, further comprising introducing an inert gas into the reaction vessel.

13. The method according to claim 6, wherein the reaction vessel is equipped with a condenser having a reaction vessel end and a distal end, wherein the distal end is fluidly coupled to a source of inert gas and the source of inert gas is configured to produce a positive pressure of the inert gas in the reaction vessel.

14. The method according to claim 12, further comprising adjusting the source of the inert gas to produce a pressure of about 5 Torr (0.1 psi) to about 1000 Torr (20 psi) in the reaction vessel.

15. The method according to claim 1, wherein the fiber reinforced polymer comprises an epoxy binder.

16. The method according to claim 1, wherein the Lewis base is Triphenylphosphine oxide.

17. The method according to claim 1, wherein the Lewis base is Triphenylphosphine sulfide.

18. The method according to claim 1, wherein the Lewis base is Triphenylphosphine oxide and the temperature of the molten Lewis base is maintained between about 150° C. and 360° C. in the reaction vessel for the period of time sufficient to at least partially depolymerize a portion of the fiber reinforced polymer to yield free fiber.

19. The method according to claim 1, wherein the Lewis base is Triphenylphosphine sulfide and the temperature of the molten Lewis base is maintained between about 150° C. and 360° C. in the reaction vessel for the period of time sufficient to at least partially depolymerize a portion of the fiber reinforced polymer to yield free fiber.

* * * * *